US010707684B2

(12) United States Patent
Brombach

(10) Patent No.: US 10,707,684 B2
(45) Date of Patent: Jul. 7, 2020

(54) METHOD FOR FEEDING ELECTRICAL POWER INTO AN ELECTRICAL SUPPLY NETWORK

(71) Applicant: Wobben Properties GmbH, Aurich (DE)

(72) Inventor: Johannes Brombach, Berlin (DE)

(73) Assignee: Wobben Properies GmbH, Aurich (DE)

(*) Notice: Subject to any disclaimer, the term of this patent is extended or adjusted under 35 U.S.C. 154(b) by 49 days.

(21) Appl. No.: 16/072,844

(22) PCT Filed: Jan. 27, 2017

(86) PCT No.: PCT/EP2017/051762
§ 371 (c)(1),
(2) Date: Jul. 25, 2018

(87) PCT Pub. No.: WO2017/129740
PCT Pub. Date: Aug. 3, 2017

(65) Prior Publication Data
US 2019/0036342 A1 Jan. 31, 2019

(30) Foreign Application Priority Data
Jan. 27, 2016 (DE) ........................ 10 2016 101 469

(51) Int. Cl.
*H02J 3/38* (2006.01)
*F03D 7/02* (2006.01)
(Continued)

(52) U.S. Cl.
CPC ............ *H02J 3/386* (2013.01); *F03D 7/0284* (2013.01); *H02J 3/46* (2013.01); *F05B 2270/335* (2013.01);
(Continued)

(58) Field of Classification Search
CPC ............ H02J 3/386; H02J 3/46; F03D 7/0284
See application file for complete search history.

(56) References Cited

U.S. PATENT DOCUMENTS 6,784,564 B1 * 8/2004 Wobben ................ F03D 7/0284
290/44
8,489,247 B1 * 7/2013 Engler ..................... F01D 17/24
700/291
(Continued)

FOREIGN PATENT DOCUMENTS

DE 102011006670 A1 10/2012
DE 102012212366 A1 1/2014
(Continued)

OTHER PUBLICATIONS

Ruttledge, "Emulated Inertial Response From Wind Turbines: Gain Scheduling and Resource Coordination," *IEEE Transactions on Power Systems* 31(5):3747-3755, Sep. 2016.

Primary Examiner — Tulsidas C Patel
Assistant Examiner — Joseph Ortega
(74) Attorney, Agent, or Firm — Seed IP Law Group LLP

(57) ABSTRACT

A method for feeding electrical power at a network connection point into an electrical supply network by at least one wind power installation includes generating electrical power from wind, feeding the generated electrical power or a portion thereof into the electrical supply network, offering an instantaneous reserve for additionally feeding or reducing the feeding into the electrical supply network in order to support the electrical supply network, and additionally feeding electrical power or reducing the fed-in power up to the offered instantaneous reserve, depending on a network property and/or an external requirement. The method is operative to support the electrical supply network. A reserve level of the offered instantaneous reserve is settable as an offer level.

19 Claims, 7 Drawing Sheets

(51) Int. Cl.
*H02J 3/46* (2006.01)
*H02J 3/24* (2006.01)

(52) U.S. Cl.
CPC ............... *H02J 3/24* (2013.01); *Y02E 10/723* (2013.01); *Y02E 10/763* (2013.01)

(56) References Cited

U.S. PATENT DOCUMENTS

| | | | | |
|---|---|---|---|---|
| 9,920,746 | B2* | 3/2018 | Diedrichs | F03D 9/257 |
| 10,027,266 | B2* | 7/2018 | Beekmann | F03D 7/0276 |
| 10,072,634 | B2 | 9/2018 | Busker | |
| 10,270,287 | B2* | 4/2019 | Beekmann | F03D 7/026 |
| 2003/0011348 | A1* | 1/2003 | Lof | H02J 3/382 |
| | | | | 322/37 |
| 2003/0155773 | A1* | 8/2003 | Wobben | F03D 7/042 |
| | | | | 290/44 |
| 2005/0200133 | A1* | 9/2005 | Wobben | H02J 3/40 |
| | | | | 290/55 |
| 2006/0142899 | A1* | 6/2006 | Wobben | F03D 7/0272 |
| | | | | 700/286 |
| 2009/0055030 | A1* | 2/2009 | Mayor | F03D 7/0284 |
| | | | | 700/287 |
| 2011/0074151 | A1* | 3/2011 | Burra | F03D 9/10 |
| | | | | 290/44 |
| 2011/0144816 | A1* | 6/2011 | Morjaria | F03D 9/257 |
| | | | | 700/287 |
| 2011/0166717 | A1* | 7/2011 | Yasugi | F03D 7/0284 |
| | | | | 700/287 |
| 2012/0267952 | A1* | 10/2012 | Ballatine | H02J 13/0003 |
| | | | | 307/26 |
| 2013/0184884 | A1* | 7/2013 | More | F03D 7/0284 |
| | | | | 700/291 |
| 2013/0184886 | A1* | 7/2013 | Pollack | B60L 53/30 |
| | | | | 700/291 |
| 2014/0025351 | A1* | 1/2014 | Ghosh | G06F 30/20 |
| | | | | 703/2 |
| 2014/0084587 | A1* | 3/2014 | Beekmann | F03D 7/0276 |
| | | | | 290/44 |
| 2014/0103655 | A1* | 4/2014 | Burra | F03D 7/028 |
| | | | | 290/44 |
| 2014/0142776 | A1* | 5/2014 | Nielsen | G06F 1/26 |
| | | | | 700/295 |
| 2014/0246857 | A1* | 9/2014 | Giertz | F03D 7/0264 |
| | | | | 290/44 |
| 2014/0306533 | A1* | 10/2014 | Paquin | H02J 3/383 |
| | | | | 307/52 |
| 2014/0316592 | A1 | 10/2014 | Haj-Maharsi et al. | |
| 2015/0069836 | A1* | 3/2015 | Beekmann | H02J 3/14 |
| | | | | 307/24 |
| 2015/0105923 | A1* | 4/2015 | Beekmann | F03D 9/007 |
| | | | | 700/287 |
| 2015/0115609 | A1* | 4/2015 | Bohlen | F03D 9/25 |
| | | | | 290/44 |
| 2015/0137518 | A1* | 5/2015 | Yin | F03D 7/0284 |
| | | | | 290/44 |
| 2015/0148974 | A1* | 5/2015 | Diedrichs | H02J 3/16 |
| | | | | 700/287 |
| 2015/0198145 | A1* | 7/2015 | Diedrichs | F03D 7/048 |
| | | | | 700/287 |
| 2015/0226185 | A1* | 8/2015 | Beekmann | H02J 3/386 |
| | | | | 290/44 |
| 2015/0236511 | A1* | 8/2015 | Strese | H02J 3/14 |
| | | | | 307/62 |
| 2015/0267683 | A1* | 9/2015 | Ubben | F03D 7/00 |
| | | | | 290/44 |
| 2015/0280629 | A1* | 10/2015 | Diedrichs | F03D 9/255 |
| | | | | 290/44 |
| 2015/0300320 | A1* | 10/2015 | Diedrichs | F03D 9/255 |
| | | | | 290/44 |
| 2016/0049792 | A1* | 2/2016 | Burra | H02J 3/386 |
| | | | | 307/52 |
| 2016/0079757 | A1* | 3/2016 | Matan | H02J 3/382 |
| | | | | 307/24 |
| 2016/0084892 | A1* | 3/2016 | Nielsen | G01R 21/00 |
| | | | | 702/61 |
| 2016/0099566 | A1* | 4/2016 | Murphy | H02J 3/50 |
| | | | | 700/298 |
| 2016/0109916 | A1* | 4/2016 | Li | H02J 9/062 |
| | | | | 700/295 |
| 2016/0261115 | A1* | 9/2016 | Asati | H02J 3/14 |
| 2016/0261116 | A1* | 9/2016 | Barooah | F24F 11/62 |
| 2016/0344188 | A1* | 11/2016 | Carlson | G05B 15/02 |

FOREIGN PATENT DOCUMENTS

| | | |
|---|---|---|
| DE | 102013203540 A1 | 9/2014 |
| EP | 1790850 B1 | 8/2015 |
| WO | 9933165 A1 | 7/1999 |
| WO | 03077398 A2 | 9/2003 |
| WO | 2014121794 A1 | 8/2014 |
| WO | 2014180781 A1 | 11/2014 |

* cited by examiner

METHOD FOR FEEDING ELECTRICAL POWER INTO AN ELECTRICAL SUPPLY NETWORK

BACKGROUND

Technical Field

The present invention relates to a method for feeding electrical power into an electrical supply network. In addition, the present invention relates to a wind power installation for carrying out such a method, and the invention also relates to a wind farm comprising a plurality of wind power installations for carrying out such a method. The invention also relates to an arrangement of a plurality of wind power installations or a plurality of wind farms for feeding in at a plurality of network connection points.

Description of the Related Art

It is known to feed electrical power into an electrical supply network, such as into the European interconnected grid, for example, by means of wind power installations. For feeding in, such wind power installations usually use frequency inverters that directly or indirectly feed the electric current having the desired frequency and phase into the electrical supply network. This type of feed-in thus deviates significantly from the type of feed-in of conventional large power plants, which use for feeding in a synchronous generator coupled directly to the electrical supply network. Such synchronous generators coupled directly to the network are intended to have a stabilizing effect on the electrical supply network, which for simplification may also be referred to just as network.

As a result of an increasing proportion of regenerative energy sources in the network, particularly wind power installations, it is thus feared that there will be a decrease in this stabilizing effect as a result of synchronous generators in the network.

In order to stabilize the electrical supply network with the aid of wind power installations as well, methods are already known in which the fed-in power is altered for example depending on the network frequency or the network voltage. As an example of such a frequency-dependent power regulation, reference is made to the document US 2003/0155773, and for a voltage-dependent power regulation, reference is made to the document WO99/33165. Particularly for supporting the electrical supply network by means of wind farms, it is also proposed that such a wind farm alters its fed-in power depending on external signals, which can be input in particular by the network operator. In this respect, reference is made by way of example to the published patent application US 2006/0142899. Some of these proposals have in some instances also already been adopted in network connection rules.

Such solutions are possibly not wide-ranging enough, however, particularly if the large power plants with directly coupled synchronous generators, said plants still being present in the electrical supply network, lose their dominance, or in the most extreme case even totally disappear.

Solutions for emulating the behavior of a synchronous generator have already been proposed in this regard. The European patent EP 1 790 850 B1 proposes to that end using an internal reference frame which is implemented as an integrator and emulates a virtual inertia in order to provide a variable reference frequency signal.

Even with such solutions, however, stability problems can persist, become greater or be newly added in the network. Firstly, it should be taken into consideration that even a stabilization of the network by synchronous generators does not function ideally in all regards. The high inertia of the synchronous generators on the one hand produces a balancing and hence at least partly stabilizing effect, but can also obstruct a rapid regulation. Network oscillations are known, for example, in the case of which such synchronous generators of a plurality of large power plants can oscillate relative to one another. It should also be taken into consideration that a complete emulation of a large power plant would have to emulate not only the basic behavior of a synchronous generator, but also the size thereof, which can be specified in particular by the respective rated power. At the present time many wind power installations are required to attain the rated power of a large power plant. Even wind farms comprising a plurality of wind power installations regularly have a significantly lower power than a large power plant. Consequently, there remains at least also the difference that wind power installations implement very much more highly decentralized feed-in by comparison with large power plants.

The German Patent and Trademark Office searched the following prior art in the priority application with respect to the present application: US 2003/0155773 A1, US 2006/0142899 A1, US 2011/0074151 A1, US 2014/0316592 A1, EP 1 790 850 B1, WO 99/33165 A1, WO 2014/121794 A1 and Ruttledge, L, Flynn, D.: "Emulated Inertial Response From Wind Turbines: Gain Scheduling and Resource Coordination" in IEEE Transactions on Power Systems, vol. 31, No. 5, pp. 3747-3755, Dec. 28, 2015.

BRIEF SUMMARY

A method for feeding electrical power at a network connection point into an electrical supply network is proposed, wherein the feed-in at the network connection point ensues by means of at least one wind power installation. For this purpose, provision can also be made of a plurality of wind power installations, in particular a wind farm. In this case, the wind power installation, or if appropriate the plurality of wind power installations, generate(s) electrical power from wind. This power which was correspondingly generated or converted from power from the wind is fed into the electrical supply network. The power generated by the aerodynamic rotor and the fed-in power can be different because, e.g., losses occur and/or stored energy can be concomitantly used. As a simplification, however, preferably the entire power generated from the wind is fed into the electrical supply network. That can be carried out via a frequency inverter, in particular, which obtains in rectified form, e.g., the electrical power generated by the wind power installation and then, from this rectified power, that is to say in particular on the basis of rectified voltage in a DC voltage link circuit, by means of an inverter, generates a desired current in terms of absolute value and phase and feeds it in.

In addition, it is proposed to offer an instantaneous reserve for additionally feeding or reducing the feeding into the electrical supply network in order to support the electrical supply network. The at least one wind power installation or else some other control device linked thereto thus offers an instantaneous reserve. That means in particular that such an instantaneous reserve is kept available and information is preferably also provided by the relevant at least one wind power installation or else the control device mentioned, such that other wind power installations, other generators in the electrical supply network or else the network operator can know and adapt to said instantaneous reserve.

Correspondingly, feeding into the electrical supply network is also performed as necessary up to this offered instantaneous reserve. Depending on the network state, consideration is also given to reducing the feeding in of the electrical power, in order thereby to support the network. That, too, is included in the fact that said instantaneous reserve is offered. Explanations hereinafter concerning increasing the feeding in analogously also relate to the case of reducing the feeding in of the electrical power. Here the offered instantaneous reserve or a portion thereof can be fed in depending on a network property and additionally or alternatively depending on an external requirement or the feed-in can be reduced, in order thereby to support the electrical supply network. The instantaneous reserve is thus offered and also provided for the demand then actually occurring. In the case of an feed-in depending on a network property, consideration is also given to the fact that this dependence or a dependence function correspondingly stored or taken as a basis requires only a portion of the instantaneous reserve. In this case, it is possible to implement this feed-in depending on a network property, e.g., an feed-in depending on a network frequency or a network voltage. It is then furthermore proposed that the level of the offered instantaneous reserve, which is referred to here as reserve level or else synonymously as offer level, is settable. The at least one wind power installation thus offers an instantaneous reserve which it also feeds in as necessary and which can be used for network support. However, said instantaneous reserve is not a fixed value, but rather can be set.

By providing an instantaneous reserve, what is firstly achieved is that, in principle, the electrical supply network can also be supported by wind power installations, that is to say by said at least one wind power installation. Certain parallels with a directly coupled synchronous generator are discernible in this respect. Such a directly coupled synchronous generator provides an instantaneous reserve by means of its high rotational speed in conjunction with a rotating mass and this is then regularly retrieved by the physical behavior of said synchronous generator. If, e.g., a state in which more power is consumed than currently fed in arises in the network, that affects the directly coupled synchronous generator. In particular, the latter then supplies more power, as a result of which it becomes slower, which regularly also becomes apparent as frequency reduction in the network. In this case, therefore, the synchronous generator delivers a portion of its rotational energy to the electrical supply network.

By providing an instantaneous reserve by means of the at least one wind power installation, what is thus firstly also achieved is that a network support can be carried out if more power is consumed than generated. For compensation, more power can be fed in in the short term. If there is more power in the electrical supply network than is consumed, for compensation less power can be fed in for a short time. In the case where more power is intended to be fed in, the at least one wind power installation can feed in its instantaneous reserve or a portion thereof for network support.

That is also based on the concept, in particular, that in some instances even nowadays very much reserve energy is contained in the rotational movement of wind power installations. Although a wind power installation would appear to have stored less rotational energy than a large power plant in its directly coupled synchronous generator, in return there are very many wind power installations. Relative to the rated power, wind power installations often have a higher rotational energy. The rotors of modern wind power installations have large diameters with heavy rotor blades, too, owing to their size and have a high moment of inertia as a result. Accordingly, a great deal of energy can be stored therein despite a comparatively low rotational speed. This energy can be used for network support.

However, there are also other possibilities for providing such an instantaneous reserve by means of a wind power installation. By way of example, a wind power installation can also additionally access an electrical energy store. Such a store could be provided, e.g., in the form of an electrical battery, wherein said battery can be connected, e.g., to a DC voltage link circuit of the inverter. For this example, the same inverter that also feeds in the power generated from wind can additionally feed in electrical power from the battery store. Feeding in the instantaneous reserve or a portion thereof can thus be carried out in a simple manner by the same inverter. Additionally or alternatively, a capacitor, in particular a capacitor bank, can be provided for providing the instantaneous reserve or a portion thereof. It has been recognized that instantaneous reserve to be provided by a wind power installation in most hours of operation is comparatively low and a capacitor bank can store enough energy for this purpose. Preferably, a capacitor, in particular a capacitor bank, is combined with a battery store. In this case, the capacitor can rapidly supply a first portion of a support power and the battery can be used as necessary to supply further support power if that is still necessary.

In this respect, by providing an instantaneous reserve by means of the at least one wind power installation, it is possible to make a contribution to network support, particularly if many wind power installations behave in this way. By way of example, a wind farm comprising many wind power installations could provide an instantaneous reserve of the order of magnitude such as could be implemented by a large power plant by means of its large rotating synchronous generator.

Furthermore, it is now proposed, however, that the level of the offered instantaneous reserve is settable as a reserve level. The reserve level is thus the level of the offered instantaneous reserve. As a result, it is possible for the dynamic behavior of the electrical supply network already to be structurally influenced in a targeted manner. By way of example, it happens that synchronous generators of large power plants that feed an additional power into the electrical supply network can lead to a network oscillation. In this respect, a network oscillation is a phenomenon in which the frequency in the electrical supply network fluctuates, and in the worst case might even surge up.

In a simplification this can be explained such that a synchronous generator, on the basis of the behavior described above, feeds additional power into the electrical supply network or else reduces its power if there appears to be a demand. This demand is then met. Possibly even somewhat more power than required is fed in. A synchronous generator that is spatially far away then operates entirely similarly in principle and also increases its power. Accordingly, there is then more power in the network and that in turn leads to a reduced fed-in power. If less power is then fed in again, a situation of a power undershoot can arise again. Accordingly, an oscillation can arise here.

In the case of the proposed solution, the offered instantaneous reserve is settable in terms of the level, that is to say that the reserve level is settable and that is preferably employed skillfully such that a plurality of such wind power installations in the network behave differently. In particular, a correspondingly varyingly dynamic behavior can also be achieved by means of the instantaneous reserve of varying magnitude. It is also possible to achieve in each case an adaptation to the property of the portion of the supply network in the vicinity of the relevant network connection point.

Consequently, it may be possible, by means of the setting of the instantaneous reserve, even to improve the network structure with regard to its dynamic behavior. In other words, an electrical supply network having a more stable behavior can be achieved by means of a corresponding setting of many such wind power installations.

Preferably, reserve levels of varying magnitude are set, depending on whether they are provided for additionally feeding in, or are provided for reducing the fed-in power. A network oscillation can be counteracted by this means, too.

Preferably, the reserve level is set depending on a property of the network connection point. That concerns in particular the properties of the network connection point relative to the electrical supply network. By way of example, the instantaneous reserve can be set depending on a short-circuit current ratio at the network connection point. In this case, a short-circuit current ratio is understood to mean the ratio of the short-circuit power to the connection power. The short-circuit power is that power which the relevant electrical supply network can provide at the network connection point if a short circuit occurs there. The connection power is the connection power of the connected feed-in system, that is to say of the wind power installation or of the wind farm and hence the sum of all wind power installations of the wind farm together. Preferably, the short-circuit power directly is taken into consideration and the reserve level is set depending thereon. By this means, too, the support behavior can be well adapted to the network property.

However, consideration is also given, for example, to taking account of how near the network connection point is to a coupling point at which there is a coupling in particular to a different electrical supply network or to a currently still decoupled part of the supply network.

A further possibility is thus to take account of a determined network impedance and to set the reserve level depending thereon. Additionally or alternatively, it is proposed to set the reserve level depending on whether a subnetwork formation in which a subnetwork has formed has been identified. Particularly in the case of such a subnetwork formation, it may be advantageous to offer a large instantaneous reserve. Here consideration is also given to providing the instantaneous reserve actually only if such a subnetwork formation has been identified. Preferably, with a subnetwork formation having been identified, the instantaneous reserve is increased by a predetermined value relative to a nominal instantaneous reserve and/or relative to an instantaneous reserve set previously. In particular, it is increased here by at least 10% as predetermined value or by an absolute value.

In accordance with one embodiment, it is proposed that an instantaneous reserve is offered depending on whether the relevant wind power installation is currently generating power from wind. Provision can also preferably be made for the reserve level to be set depending on an operating state of the wind power installation. Consideration is given, in particular, to the fact that when wind is weak and there is correspondingly low generated power, the wind power installation has a low reserve level, that is to say provides or offers a low instantaneous reserve. However, consideration is also given to the opposite case, namely of providing or offering a high instantaneous reserve when wind is weak, because a significantly higher inverter capacity is available in some cases when wind is weak. Moreover, a wind power installation can provide an instantaneous reserve, e.g., even if it is not generating power from wind but has, e.g., an electrical store such as a battery store, from which an instantaneous reserve could be provided.

Preferably, it is proposed that additionally feeding in electrical power or reducing the fed-in power by means of a setting function depends on a state of the electrical supply network and depends on the reserve level. A double dependence is thus proposed. By way of example, the power additionally fed in—the same analogously applies to reducing the fed-in power, including for the further examples—can depend on a change in the network frequency. Such a change in the network frequency can also be specified by means of a temporal frequency gradient (df/dt). Preferably, the power additionally fed in depends on said frequency gradient and is all the greater, the greater said frequency gradient. The reserve level then additionally influences this dependence. The power additionally fed in, to mention one simple example, can then be proportional to the frequency gradient and proportional to the reserve level.

One configuration proposes that the reserve level acts as amplification of the setting function. The reserve level can then be adopted as a factor. For the example of the dependence on the frequency gradient (df/dt), that can be specified by the following equation:

$$P_z = P_{z0} * df/dt * Res * K$$

In this equation, $P_z$ is the power additionally fed in, $P_{z0}$ is a power reference value, df/dt is the frequency gradient, Res is the reserve level and K is a proportionality factor or normalization factor that may also adapt the physical units of the equation. The power reference value and the proportionality factor can also be combined.

What can thus be achieved is that the reserve level acts like an amplification factor, such that there may be different degrees of reaction to the same df/dt, depending on what value the reserve level has, that is to say depending on how much instantaneous reserve is provided.

In accordance with one embodiment, it is proposed that a predefined value for altering the reserve level is input to the at least one wind power installation via an interface. Consequently, the reserve level can be altered in particular externally. That gives in particular a network operator or a central control unit or a control center the opportunity to set the reserve level. As a result, present situations in the network or expected situations can also be taken into account. By way of example, by means of such a change in the reserve level, the instantaneous reserve can be set to an event, such as, e.g., an expected connection or disconnection of a large consumer, or else the connection or disconnection of a network section.

The interface can be realized in a wired or wireless fashion. Consideration is also given, in particular, to utilizing existing data transfer paths, in particular existing data lines, for this inputting of a predefined value.

Additionally or alternatively, in accordance with one embodiment, it is proposed that the at least one wind power installation provides its set reserve level as information. As a result, other active units, in particular other feed-in units, can be orientated thereto. In particular, as a result it is known what instantaneous reserves are available. Preferably, this information is transferred to other wind power installations and additionally or alternatively a central control unit monitoring a plurality of network connection points. Particularly such a central control unit monitoring a plurality of network connection points, which control unit can be configured as a network control device, can thereby survey the overall position of available instantaneous reserves in the electrical supply network or the relevant subsection and possibly initiate control measures.

Preferably, an instantaneous reserve at the level of the reserve level is provided and that can be done by various measures, which can also be combined. One of these proposed measures is to provide a rotational speed range for operating the wind power installation with a rotational speed in this range. In this case, the rotational speed relates in principle to the rotational speed of the rotor of the wind power installation. In the case of a gearless wind power installation, this is identical to the rotational speed of the generator.

The rotational speed range and the concrete rotational speed are chosen such that a decrease in the rotational speed down to a lower value of the rotational speed range can provide the instantaneous reserve at the level of the reserve level from rotational energy. Firstly, this is a matter of affording the possibility of this provision, independently of whether this instantaneous reserve is then also wholly or partly retrieved. The proposed predefinition of a rotational speed range, which may also be referred to as a rotational speed band, also makes use of the insight, in particular, that although a wind power installation is preferably operated with an optimum rotational speed, this rotational speed can be altered in a predefined range, which is set here specifically as the rotational speed range, without the power generation significantly deteriorating. In this case, it should be taken into consideration that a full reserve power is actually retrieved rarely, e.g., less than once per year.

An additional factor is that a higher instantaneous reserve can also achieve a higher amplification of the support measure. In other words, a higher support power can then generally be fed in. If the behavior of a conventional large power plant is considered and if a directly coupled synchronous generator is assumed, then the latter, e.g., in an allowed frequency band of the network frequency of +−2%, (e.g., 50 Hz+−1 Hz), owing to its direct coupling, can also provide support power only with +−2% change in rotational speed. This relationship is fixed by virtue of the direct coupling between frequency and rotational speed.

In the proposed method, too, a rotational speed range can be conceptually assigned to an allowed frequency band. Here, too, a rotational speed range of $n_N$+−2% can be assigned for example to an allowed frequency band of $f_N$+−2%. However, if the reserve level is then increased and provided by means of an increase in the rotational speed range, a higher rotational speed range can thus also be assigned to the allowed frequency band, which in principle does not change. For example, a rotational speed range of $n_N$+−10% could then be assigned to the frequency band of $f_N$+−2% mentioned by way of example if the reserve level has correspondingly increased. That shows that the use of support power from the rotational energy of the rotating generator is now controllable. That, too, is an advantage of the proposed method.

However, it is additionally possible to regulate, e.g., only a narrower frequency band. The rotational speed range could then be assigned to this narrower frequency band. To tie in with the above example, e.g., the rotational speed range of $n_N$+−10% could then be assigned to a frequency band of $f_N$+−1%. The proportional support power would have doubled as a result. That corresponds to an increase in the amplification. With the abovementioned formula $P_z = P_{z0} * df/dt * Res * K$, that could be achieved by means of a corresponding increase, that is to say here doubling, of the proportionality factor.

In this respect, the rotational speed range is not permitted to be predefined to be excessively large, because a high power deterioration could then indeed arise at its edge. It should be taken into consideration that the occurrence of such a great deviation happens very rarely. In this case, it is necessary here to weigh the need to provide a high instantaneous reserve, on the one hand, against the need to operate the wind power installation as far as possible at its optimum operating point, on the other hand. In particular, the rotational speed can be chosen such that it assumes its optimum value. The rotational speed range is then placed around said optimum value, e.g., symmetrically such that the edge of said rotational speed range respectively lies 10 percent above/below this optimum rotational speed. If the rotational speed is then reduced, that is to say from the optimum rotational speed to the lower range of said rotational speed range in the example mentioned, that is to say reduced by 10 percent in the example mentioned, then rotational energy is delivered in this case. This can be calculated and forms the instantaneous reserve that is able to be provided thereby. However, such a large change occurs only very rarely. In a 50 Hz network, that could correspond to a frequency dip to 47.5 Hz or 51.5 Hz, which is to be expected less often than annually.

The upper value of the rotational speed range, that is to say the upper limit of the rotational speed range chosen, can be used to reduce the feeding of the power into the network, that is to say in particular for network support by power reduction if there is too much power in the network.

At any rate this variant of predefining a rotational speed range has the advantage that the wind power installation can continue to be operated further at its optimum operating point, that is to say in particular with an optimum rotational speed. It is only if the case actually occurs in which the instantaneous reserve is retrieved or has to be provided that the rotational speed reduction mentioned is carried out. Predefining the instantaneous reserve here provides, on the one hand, a calculable value for the network support of the electrical supply network, which can be used for calculation, e.g., by the operator of the electrical supply network. In addition, however, this predefined instantaneous reserve also provides certainty about at what operating point the wind power installation is altered by the delivery of said instantaneous reserve. It is thus known beforehand and can be estimated to what extent the operating point deteriorates and in particular that, however, the wind power installation can continue to operate with such an operating point.

In accordance with a further, very similar embodiment, it is proposed that provision is made of a lower rotational speed and an upper rotational speed, which is increased with respect to the lower rotational speed by a difference rotational speed. The wind power installation is then operated at the upper rotational speed. The rotational speed is thus deliberately increased in order thereby to be able to provide a higher rotational energy as instantaneous reserve.

In this case, the difference rotational speed is chosen such that decreasing the upper rotational speed to the lower rotational speed delivers a rotational energy as instantaneous reserve at the level of the reserve level. Moreover, provision is made of corresponding rotational speeds which enable a targeted decrease in the rotational speed in order to release rotational energy. It is also proposed here, in particular, to operate the wind power installation with a higher rotational speed than the optimum rotational speed.

Additionally or alternatively, it is proposed to correspondingly alter an operating point of the at least one wind power installation. This, too, can concern an alteration of the rotational speed. However, consideration is also given to other possibilities, such as, e.g., setting other blade angles in the partial load range. That can be combined here with an altered rotational speed, and that is to say with the rotational speed and the blade angles being altered.

Additionally or alternatively, it is proposed to provide an electrical energy store having storage energy that is stored and retrievable therein at the level of the reserve level. In other words, firstly an energy store is proposed, which can be, e.g., a battery store. However, it can also comprise other storage media, such as, e.g., a gas store or a separate flywheel store, which convert their stored energy into electrical energy as necessary. What can be achieved by providing such an electrical energy store is that the wind power installation can provide additional power and thus additional instantaneous reserve in accordance with said energy store.

Consideration is also given to the fact that the wind power installation as such in principle is operated further at its optimum operating point and only the electrical energy store mentioned provides corresponding instantaneous reserve. This, too, can be altered in a manner governed by the situation. By way of example, it is proposed, upon predefining or upon offering a comparatively low instantaneous reserve, for this purpose to provide only the electrical store and also additionally to provide above-described rotational energy of the rotor of the wind power installation only upon a high instantaneous reserve being offered. Incidentally, this embodiment in the case of energy stores is based on the retrievable storage energy. This can concern battery stores, for example, which are discharged only to a certain discharge level, proceeding from which damage could occur. In that case, energy would still be stored but can no longer be referred to as retrievable.

In accordance with a further embodiment, it is proposed that a network oscillation describing an oscillating frequency in the electrical supply network is detected in the electrical supply network, and that the reserve level is set depending on this detected network oscillation. If it is thus detected that the frequency increases and decreases again in an oscillating manner, then this can be taken as a reason to change the instantaneous reserve respectively offered. As a result, it is possible to alter the property for the network support of the relevant wind power installation and thus also to alter the inherent dynamic range of the electrical supply network. That works particularly if very many wind power installations implement a corresponding measure.

In principle, the embodiments are combinable. It is pointed out here, in particular, that the alteration of the reserve level depending on the detected network oscillation can also advantageously be combined with the proposal that the reserve level is set depending on a property of the network connection point. In this regard, it is proposed, in particular, that upon the detection of a network oscillation which is relevant to the entire electrical supply network or at least a network section comprising a plurality of network connection points, the reserve levels of the individual network connection points are set or altered differently.

Preferably, the reserve level is set depending on a coupling strength of the network connection point. Such a coupling strength is a measure of how strongly the network connection point is coupled to the electrical supply network. This concerns in particular the question of to what extent changes in the electrical supply network, in particular voltage changes and/or changes in the power balance, affect the relevant network connection point. The less that has an effect, the lower the coupling strength. Preferably, the instantaneous reserve is set to be all the smaller, the lower the coupling strength.

In accordance with one configuration, it is proposed that, for network support, in addition to the power generated, energy up to the level of the reserve level is fed into the electrical supply network. This is preferably done depending on a change in the network voltage of the electrical supply network. Particularly in the event of the network voltage falling below the rated voltage, it is proposed to feed in power for support. Additionally feeding in electrical power or reducing the fed-in power up to the offered instantaneous reserve can also be carried out depending on the network frequency, which may be an indicator of a power balance.

Additionally or alternatively, it is proposed to feed in the additional power depending on a change in the network frequency of the electrical supply network. Consequently, what is considered is not or not only the absolute frequency of the electrical supply network, but rather the change therein. In particular, a frequency gradient (df/dt) can be considered and it is proposed to feed all the more power into the electrical supply network for support or to reduce the fed-in power to a greater extent, the greater the absolute value of the frequency gradient.

Additionally or alternatively, it is proposed to feed in the additional energy depending on a power difference between generated and consumed power in the electrical supply network. Particularly if more power is consumed than fed in by generating units, such additional energy can be fed in for compensation and thus for support.

Additionally or alternatively, it is proposed to feed in the additional energy depending on a requirement communicated externally. That can be done in particular depending on a requirement by the operator of the electrical supply network. As a result, the operator of the electrical supply network, that is to say the network operator, can use such wind power installations as a controller. In particular, a combination is advantageous here, too, if the network operator, or some other central control unit, both can set the reserve level and can predefine if such an instantaneous reserve input by the reserve level is actually also fed in. By way of example, for a frequency synchronization in a subnetwork, provision can be made for feeding in a higher power for a short time.

In accordance with a further embodiment, it is proposed that, for network support, additionally feeding in electrical power or reducing the fed-in power is performed while drawing or storing storage energy of at least one capacitor, rotational energy of the at least one wind power installation, and storage energy of at least one battery store, wherein depending on the amount of energy to be drawn or to be stored firstly storage energy is drawn from or stored in the capacitor, then rotational energy from the at least one wind power installation is used if even further energy is required, and then storage energy from the battery store is used if even further energy is then required. The use of the rotational energy concerns in particular rotational energy of the aerodynamic rotor of the wind power installation. It is thus proposed here to use rotational energy from the aerodynamic rotor or to store energy as rotational energy in the aerodynamic rotor.

What is thereby achieved, firstly, is that a large volume of control energy is provided by the use of a plurality of energy sources and/or energy sinks. The targeted order of using firstly the capacitor, then the rotor and finally the battery store skillfully utilizes these different storage media. Often the storage energy of the capacitor can be sufficient as instantaneous reserve and be provided by the capacitor rapidly and without a memory effect.

If even more energy is required, the aerodynamic rotor is used. In this case, it has been recognized that the latter also operates without a memory effect and that it can be advantageous to transition from the capacitor to the aerodynamic rotor as energy source. It is only if even that is insufficient that the battery store is used.

In addition, a method for feeding electrical power at a plurality of network connection points into an electrical supply network by means of in each case at least one wind power installation is proposed, wherein in each case a method in accordance with at least one of the embodiments described above is used for feeding in at each of the network connection points and the reserve level is settable differently for each of the network connection points.

As a result, it is possible to perform, in particular, a targeted and coordinated alteration or setting of the dynamic range of the electrical supply network or at least of the affected section of the electrical supply network. Preferably, this is carried out by means of a central control unit, particularly a network control device, and additionally or alternatively it is proposed to provide such a central setting possibility for a network operator.

Preferably, for a plurality of network connection points together an instantaneous reserve offered overall is predefined in terms of the level. A reserve level is then determined depending thereon for each of said network connection points, in particular such that the sum of these reserve levels corresponds to the level of the instantaneous reserve offered overall. As a result, by means of the coordinated setting of the reserve level of a plurality, in particular a large number, of network connection points or of the wind power installations of a large number of network connection points, it is also possible to provide an instantaneous reserve of significant magnitude overall. In this respect, in a first step, an instantaneous reserve that is necessary or at least desirable overall can be predefined. In a second step, a corresponding distribution of the instantaneous reserves can then additionally be provided for influencing the dynamic range of the electrical supply network. Thus, firstly, a network support at an absolute level is achievable and, secondly, e.g., the oscillating behavior of the electrical supply network or of the relevant network section is able to be influenced.

In addition, a wind power installation for feeding electrical power at a network connection point into an electrical supply network is proposed. Such a wind power installation comprises an aerodynamic rotor and a generator for generating electrical power from wind, an feed-in unit for feeding the generated power or a portion thereof into the electrical supply network, a control unit for offering an instantaneous reserve for feeding into the electrical supply network in order to support the electrical supply network, a controller for controlling the wind power installation such that the offered instantaneous reserve or a portion thereof is fed into the electrical supply network depending on a network property and/or an external requirement, in order to support the electrical supply network, and said wind power installation comprises a setting device for setting the level of the offered instantaneous reserve as a reserve level (offer level).

Consequently, with the wind power installation wind is converted into a rotational movement by means of the aerodynamic rotor and electrical power is thereby generated from the wind by means of the generator. Said electrical power, possibly reduced by losses or other power leakages, is fed into the electrical supply network by means of an feed-in unit. The feed-in unit can be configured in particular as an inverter.

By means of a control unit, an instantaneous reserve is offered in order thus to support the electrical supply network if said instantaneous reserve or a portion thereof is fed in. The controller controls the wind power installation such that offered instantaneous reserve or a portion thereof is fed into the electrical supply network depending on a network property and additionally or alternatively depending on an external requirement, in order to achieve the desired support of the electrical supply network.

Finally, a setting device is provided, which sets the reserve level. The setting device thus sets the level of the offered instantaneous reserve. The setting device, the same applying to the control unit, can be provided as an additional element or as part of a control unit present anyway in such a wind power installation.

In particular, it is proposed that the wind power installation is prepared to carry out a method in accordance with at least one of the embodiments described above. In particular, it is proposed that the wind power installation comprises a control device for this purpose. Said control device can comprise the control unit for offering the instantaneous reserve and additionally or alternatively the setting device for setting the level of the offered instantaneous reserve, or the control unit and/or the setting device are/is provided as separate elements. The control device can, e.g., also drive an interface for data exchange, both for receiving and for transporting information.

Preferably, the wind power installation comprises at least one electrical energy store for providing the instantaneous reserve or a portion thereof. The instantaneous reserve at the level of the reserve level can thus be provided by said at least one electrical energy store, or the providing is effected by said electrical energy store and supplemented by rotational energy of the rotor of the wind power installation.

In addition, a wind farm comprising a plurality of wind power installations is proposed, wherein one, a plurality or all of the wind power installations is/are such as those described in accordance with at least one embodiment above. Additionally or alternatively, the wind farm is prepared to carry out at least one method in accordance with at least one embodiment described above. In particular, the wind farm can comprise for this purpose a control device that carries out or at least coordinates the corresponding method steps.

In addition, a network control device for controlling a plurality of feed-in devices for feeding electrical power into an electrical supply network is proposed. Each of said feed-in devices comprises at least one wind power installation for generating electrical power from wind. The feed-in device here can also in each case comprise a wind farm or be a wind farm.

In addition, each feed-in device comprises an feed-in unit for feeding the electrical power or a portion thereof in each case via a network connection point into the electrical supply network. A network connection point is thus provided for each feed-in device. The network connection point can also be regarded as part of the feed-in device.

Each feed-in device also comprises a control unit for offering an instantaneous reserve in order to provide the latter as necessary for feeding into the electrical supply network in order to support the electrical supply network. Furthermore, said feed-in device comprises a setting device for setting the level of the offered instantaneous reserve as a reserve level.

The network control device comprises moreover a data transfer device for exchanging data between the network control device and the feed-in devices. Such a data transfer device can be a radio connection, a wired connection or a combination thereof. Existing telecommunication devices can also be concomitantly used.

In addition, the network control device comprises a predefining device for predefining in each case different reserve levels to the feed-in devices in order that the feed-in devices set the level of the offered instantaneous reserve on the basis thereof. Consequently, said network control device can centrally perform a control or at least coordination of the affected feed-in devices with regard to their offered instantaneous reserve. The network control device thus coordinates how much instantaneous reserve each of the feed-in units offers and then if appropriate also feeds in.

Preferably, the feed-in devices are configured in each case as a wind farm, particularly in a manner such as has been described above in accordance with at least one embodiment of a wind farm. Additionally or alternatively, each feed-in device comprises at least one wind power installation in accordance with one of the embodiments described above. Consequently, this network control device can correspondingly coordinate a plurality of wind power installations or wind farms feeding in via different network connection points.

Preferably, the network control device comprises at least one measurement recorder for recording network states of the electrical supply network and in particular voltage levels of the electrical supply network and also the frequency of the electrical supply network can be recorded thereby. Depending thereon, by means of an evaluation apparatus, it is then possible to determine the reserve level depending on at least one of the recorded network states. By way of example, upon ascertaining a network oscillation, which is a further possibility of a network state, the evaluation apparatus can correspondingly provide different reserve levels for the different feed-in devices.

Preferably, the network control device is prepared to carry out or to coordinate a method for feeding in electrical power at a plurality of network connection points in accordance with an embodiment described above. In particular, the feed-in apparatus is also prepared to distribute a total instantaneous reserve identified as necessary or predefined externally among the individual feed-in devices.

BRIEF DESCRIPTION OF THE SEVERAL VIEWS OF THE DRAWINGS

The invention is explained in greater detail by way of example below on the basis of embodiments with reference to the accompanying figures.

DETAILED DESCRIPTION

Figure 1:
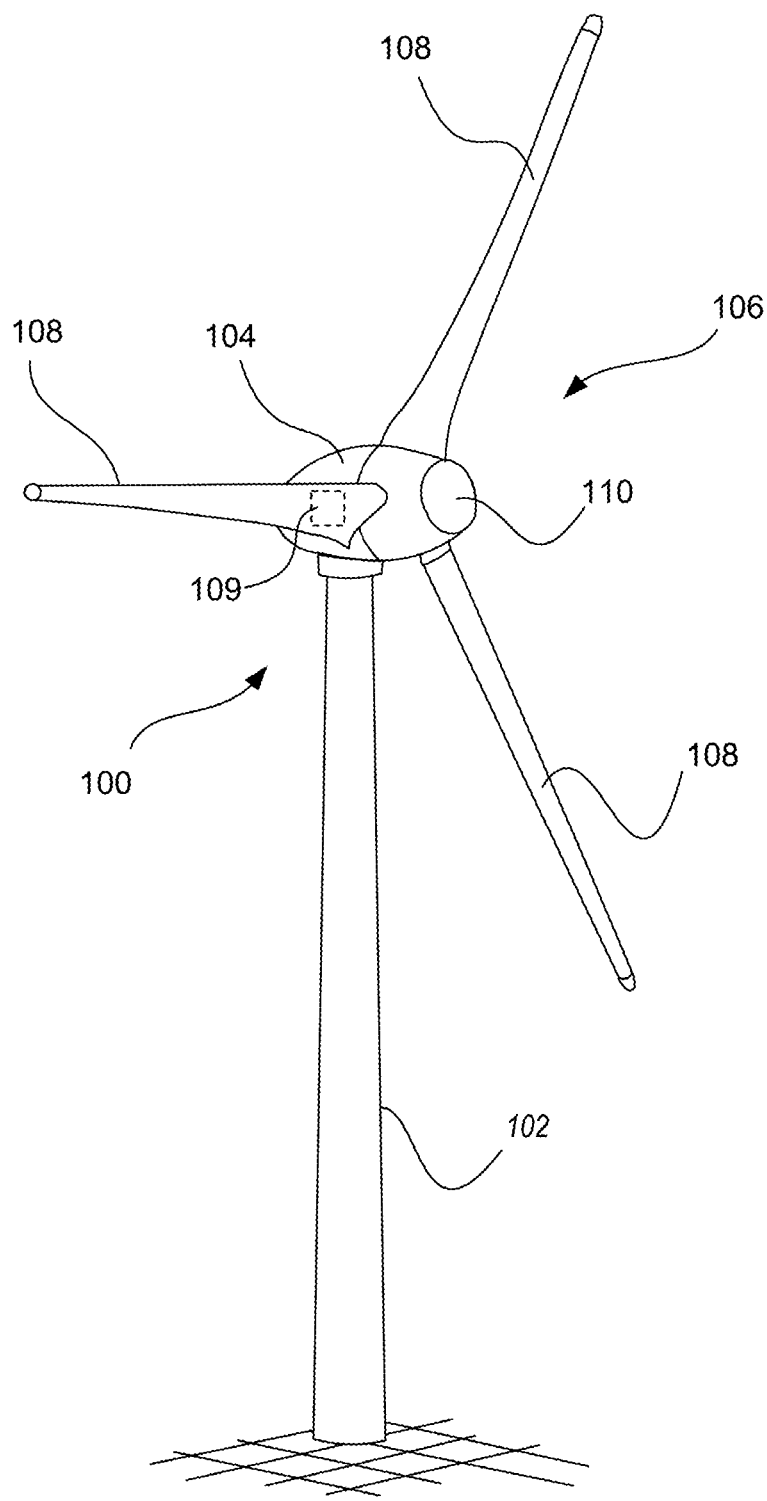
FIG. 1 shows a wind power installation in a perspective illustration.

FIG. 1 shows a wind power installation 100 comprising a tower 102 and a nacelle 104. A rotor 106 comprising three rotor blades 108 and a spinner 110 is arranged on the nacelle 104. The rotor 106 is caused to effect a rotational movement by the wind during operation and thereby drives a generator 109 in the nacelle 104.

Figure 2:
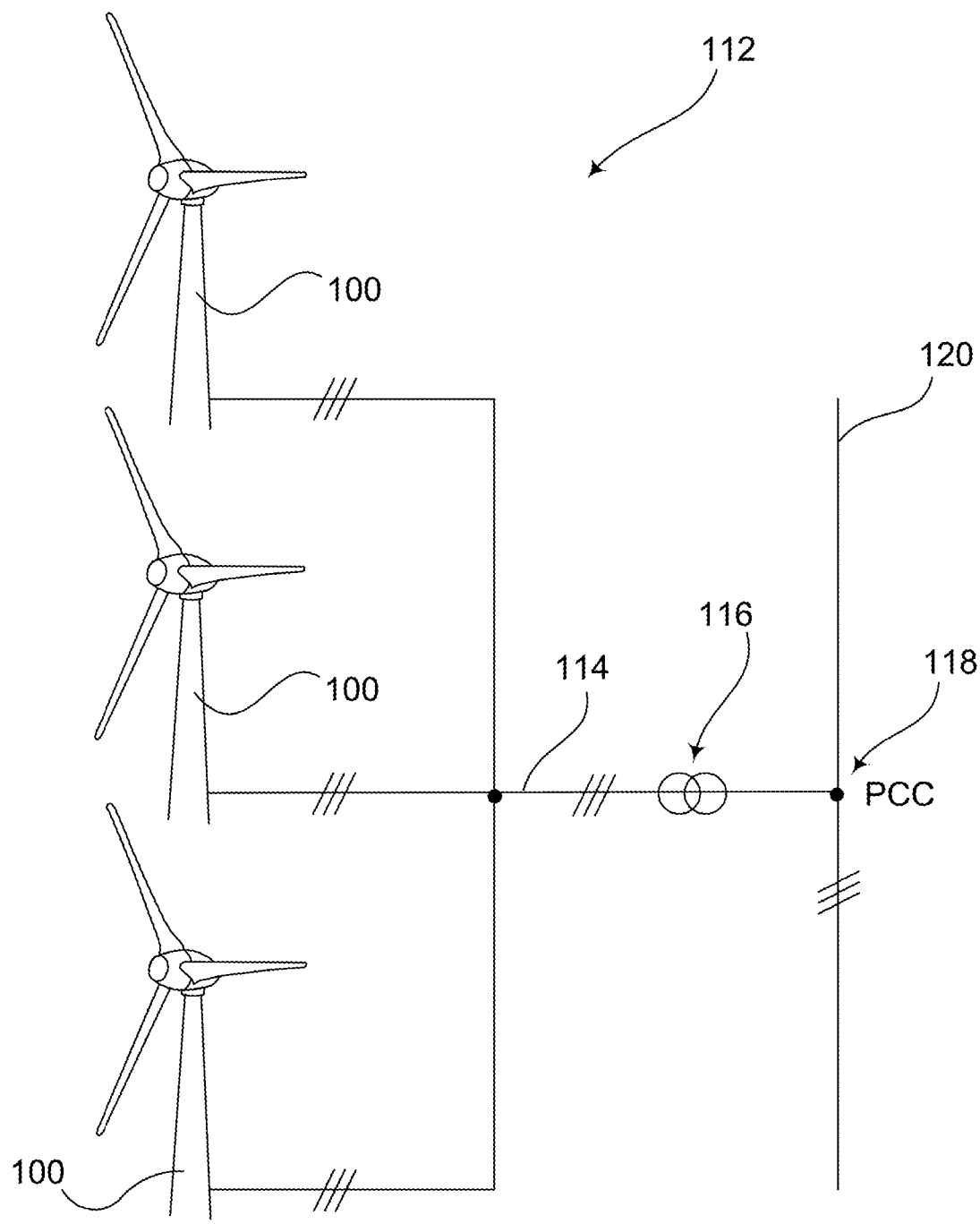
FIG. 2 shows a wind farm in a schematic illustration.

FIG. 2 shows a wind farm 112 comprising for example three wind power installations 100, which can be identical or different. The three wind power installations 100 are thus representative of basically an arbitrary number of wind power installations of a wind farm 112. The wind power installations 100 provide their power, namely in particular the generated current, via an electrical farm network 114. In this case, the respectively generated currents or powers of the individual wind power installations 100 are added and a transformer 116 is usually provided, which steps up the voltage in the farm in order then to feed it into the supply network 120 at the feed-in point 118, which is also generally referred to as PCC. FIG. 2 is merely a simplified illustration of a wind farm 112, which for example does not show a controller, even though a controller is present, of course. Moreover, by way of example, the farm network 114 can be configured differently, with for example a transformer also being present at the output of each wind power installation 100, to mention just one different exemplary embodiment.

Figure 3:
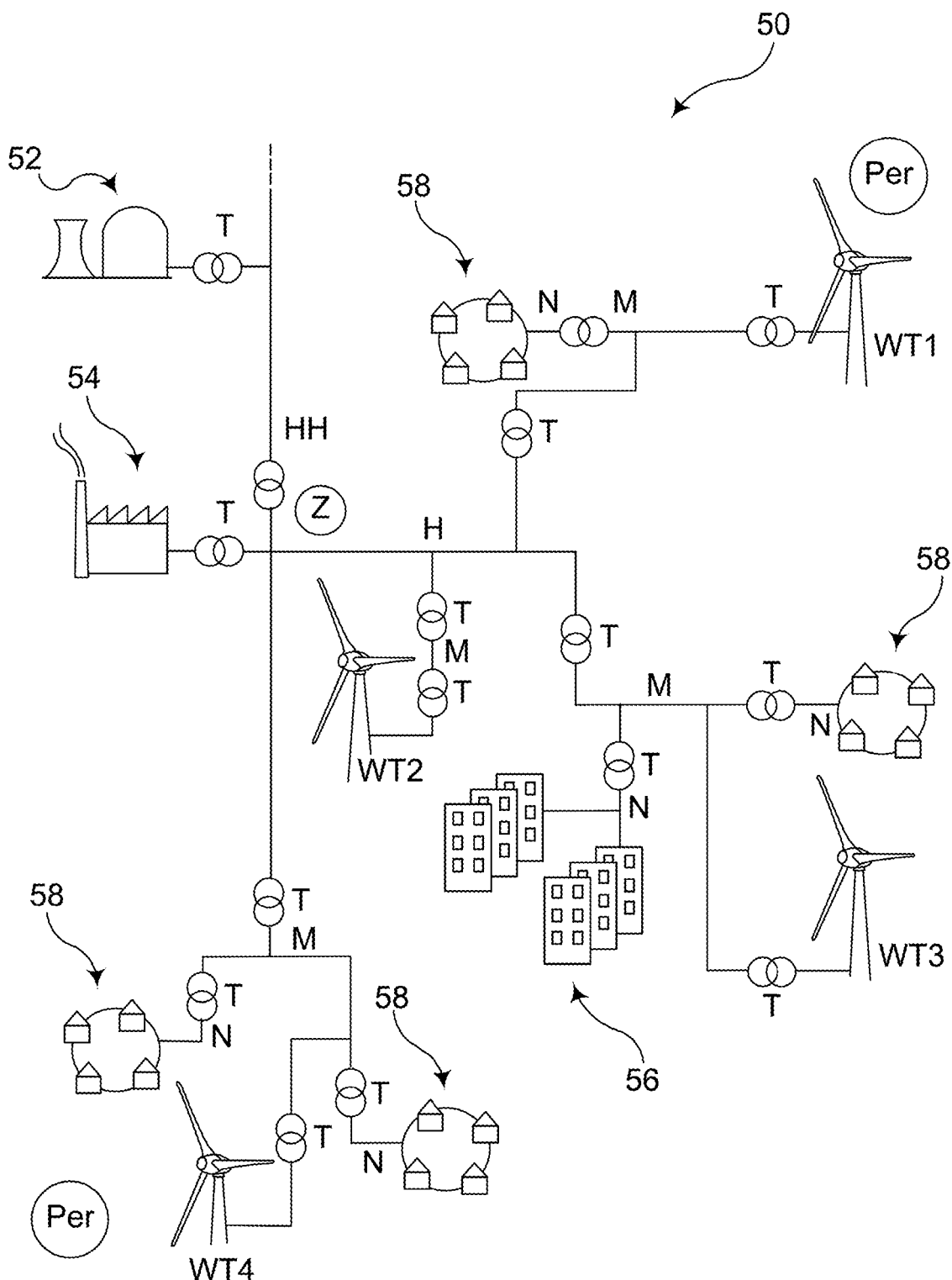
FIG. 3 schematically shows one possible network structure for illustrating central and decentralized areas.

FIG. 3 shows an electrical supply network 50 or a part thereof in a schematic illustration. Said electrical supply network 50 shows by way of example a large power plant 52, an industrial consumer 54 such as, for example, a steelworks or some other production facility, and also a town/city 56. In addition, various smaller villages 58 and four wind power installations WT1 to WT4 are depicted. The network comprises various network sections having a different voltage, namely an extra-high-voltage network HH, a high-voltage network H, a plurality of medium-voltage networks M and a plurality of low-voltage networks N. Transformers T are respectively arranged between these different networks and to the large power plant 52, the industrial consumer 54 and the wind power installations WT1 to WT4. Neither the transformers T nor the villages 58 are differentiated in their reference signs, even though they are specifically configured differently in each case, of course. The wind power installations or wind turbines WT1 to WT4 can also each be representative of a wind farm comprising a plurality of wind power installations in each case. The respective transformer T of one of the wind power installations WT1 to WT4 can also be regarded as a network connection point for the purposes of understanding the teaching explained here.

In this electrical supply network 50, the large power plant 52 constitutes a large generator with regard to the supplied amount of energy. The industrial consumer 54 constitutes a large consumer in this sense. The town/city 56 likewise forms a comparatively large consumer, and the villages 58 each form rather smaller consumers. The wind turbines WT1 to WT4 can be regarded at any rate as smaller energy generating units in comparison with the large power plant 52. However, it should be taken into consideration that the wind turbines WT1 to WT4 here can also each be representative of a wind farm. In this case, as the wind farms they can make a significant contribution to the energy generation. Even greater, however, is their proportion of available, at least potential, rotational energy. That has been recognized here and proposals are made for advantageously using said rotational energy.

In normal operation, particularly if the industrial consumer 54 is also operated and the large power plant 52 is operated, there will be a significant energy flow from the large power plant 52 to the industrial consumer 54 and a significant energy flow from the large power plant 52 to the town/city 56. If the industrial consumer 54 alters its power consumption, particularly if it leaves the network or is connected to the network, this will affect the wind turbine WT2 to a particularly great extent. The same applies to changes in the large power plant 52, particularly if the latter leaves the network. The network connection point of the wind turbine WT2 is thus coupled particularly strongly to the electrical supply network 50.

A coupling at the center or a subcenter of an electrical supply network is often stronger than at a periphery. A center is depicted here illustratively as "Z". As two peripheries, two regions are identified by "Per". However, this identification of a center and of a periphery should be understood to be illustrative. In actual fact, at the extra-high-voltage line HH in the vicinity of the large power plant 52 small dots indicate that the electrical supply network is also continued there and thus even further centers or subcenters can also arise.

However, the strength of the coupling need not or not exclusively depend on the proximity to a center. Other criteria also play a part, such as, e.g., also properties of the transmission lines. The coupling strength can change in a situation-dependent manner and/or in a time-dependent manner. It can be different, e.g., during the day and at night. In particular, a coupling of the individual network connection points with varying strengths is intended to be illustrated on the basis of this example.

Accordingly, the network connection point of the wind turbine WT2 is coupled very strongly to the electrical supply network. The wind turbine WT1 is rather somewhat at a distance and its network connection point should therefore be coupled more weakly to the electrical supply network. Great power fluctuations at the industrial consumer 54 could affect the wind turbine WT1 or its network connection point to a lesser extent than the wind turbine WT2.

Figure 6:
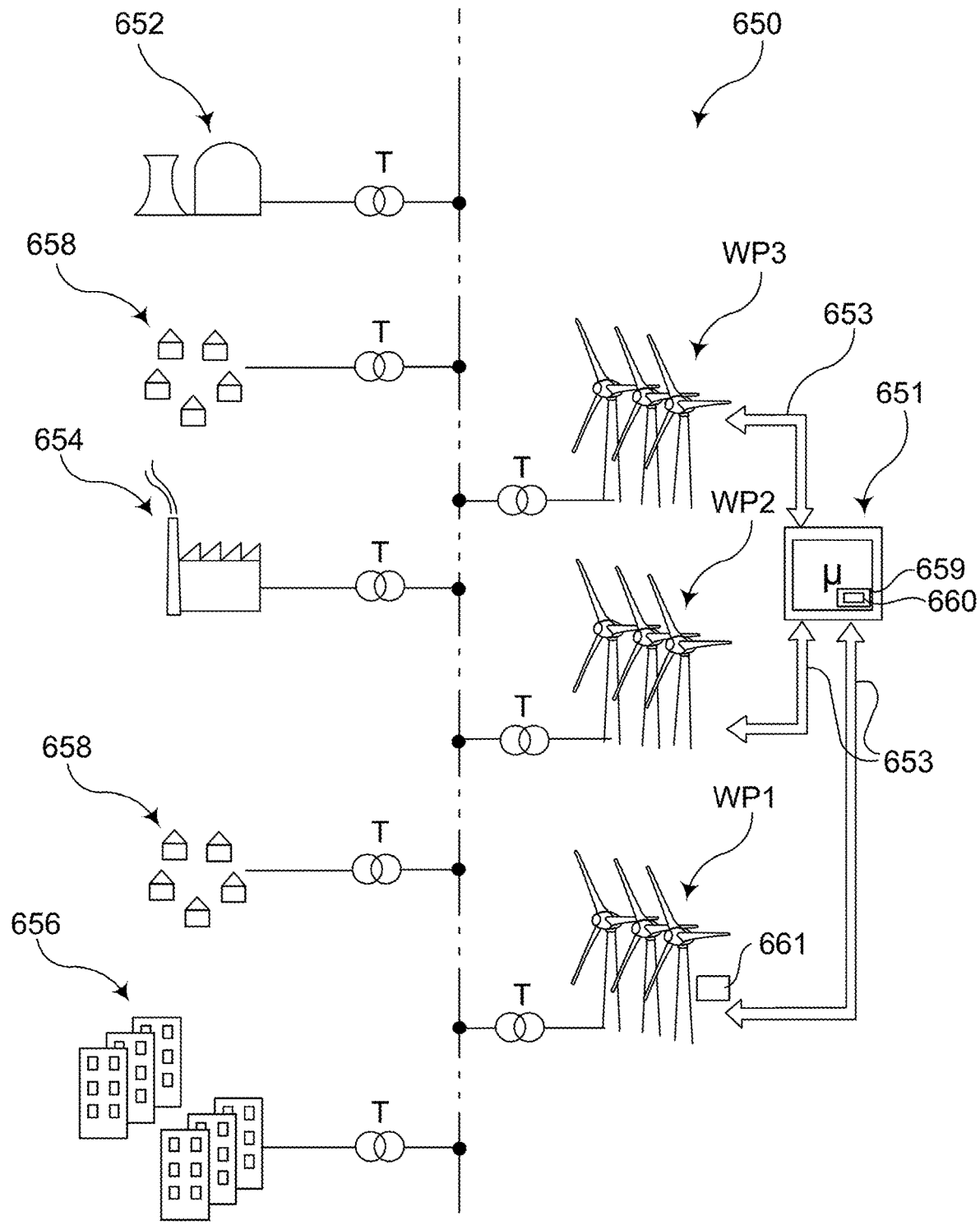
FIG. 6 illustrates a network section of an electrical supply network.

The further wind turbines WT3 and WT4 in FIG. 6, as far as the strength of the coupling of their network connection points is concerned, lie between these two wind turbines WT1 and WT2. The wind turbine WT3, or its network connection point, is coupled more weakly than the wind turbine WT2, but is coupled more strongly than the wind turbine WT1, because it feeds into the same medium-voltage network to which the town/city 56 is also connected. In this respect, the wind turbine WT4 is coupled even more weakly than the wind turbine WT3, but more strongly than the wind turbine WT1, because the wind turbine WT1 feeds into a medium-voltage network to which a village 58 is connected, whereas the wind turbine WT4 feeds into a medium-voltage network to which two villages 58 are connected. All that should be understood here merely as an illustrative example that disregards many further factors. A classification or numerical assessment, e.g., an assessment with values from 0 to 1, can be used for the coupling strengths mentioned by way of example. Said classification or said assessment can preferably be used to offer instantaneous reserves differently and then also to provide them as necessary. The reserve level can thus be set depending on a classification or assessment of the coupling strength. In particular, it is proposed to set the reserve level to be all the greater, the greater the coupling strength or the greater the assessment it was given. For the example of the structure shown in FIG. 3, that would mean that the greatest instantaneous reserve, that is to say the greatest reserve level, should be provided for the wind turbine WT2, and the least for the wind turbine WT1.

Particularly for providing the required energy for such an instantaneous reserve, it may be advantageous to operate the wind power installation with a higher rotational speed, or at least to permit a larger rotational speed band, in order that a correspondingly large amount of rotational energy can be provided. Normally, for each wind power installation there is an optimum rotational speed for each operating point, in particular for each wind speed; even if the setting is not actually carried out by means of a measurement of the wind speed, this can indeed serve for explanation.

Nevertheless, a wind power installation can be operated almost optimally with a higher or a lower rotational speed, without having to accept high losses or high loads. In other words, if a wind power installation is intended to provide a particularly great instantaneous reserve, such as, for example, the wind turbine WT2 in FIG. 3, then this can be achieved by means of rotational energy in the rotors 108 of the wind power installation 100. If the rotational speed is increased by 10%, for example, just physically approximately 20% more rotational energy is present as a result. If only the retrievable rotational energy is considered, however, then it is expedient to retrieve rotational energy only in an amount such that the installation continues to run afterward; in this regard, such an increase in the rotational speed by 10% as mentioned by way of example, relative to the retrievable rotational energy, can achieve an energy provision that is still much higher than the 20% mentioned.

For implementation, a wind power installation can select a corresponding rotational speed characteristic curve from various possible rotational speed characteristic curves, namely one having a higher rotational speed if this is desired, such as for the wind turbine WT2, for example.

Figure 4:
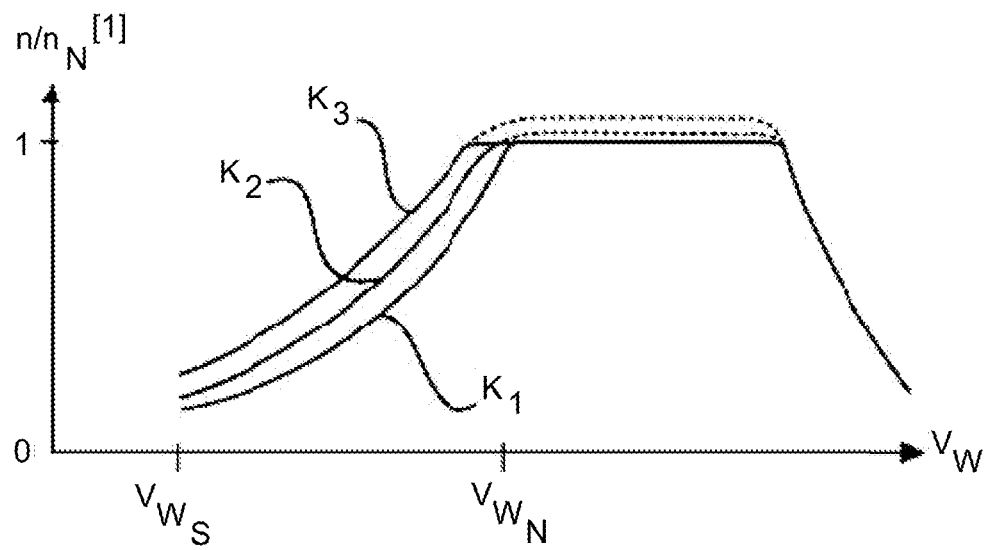
FIG. 4 illustrates various rotational speed characteristic curves.

Such different rotational speed characteristic curves are illustrated in FIG. 4. By way of example, three rotational speed characteristic curves $K_1$, $K_2$, and $K_3$ are plotted therein. This FIG. 4 serves only for illustration, however, since rotational speed/power characteristic curves are usually stored in a wind power installation, but not rotational speed/wind speed characteristic curves. In the partial load range, namely the range in which the wind power installation cannot yet supply full power and which lies between the starting wind speed $V_{WS}$ and the nominal wind speed $V_{WN}$ in FIG. 4, a power can also be assigned to each wind speed assuming optimum steady-state operation. At any rate, different characteristic curves $K_1$, $K_2$, or $K_3$ can be selected in said partial load range, depending on whether a higher rotational speed is desired for providing a higher energy.

If nominal rotational speed $n_N$ is reached at nominal wind speed, or earlier, $V_{VN}$, a rotational speed higher than the nominal rotational speed cannot usually be used, for reasons of installation safety. However, in exceptional situations, particularly if network support should be reckoned with for a short time, a higher rotational speed could be taken into consideration. That is indicated in FIG. 4 by dotted characteristic curves in the range after the nominal wind speed $V_{WN}$.

Figure 5:
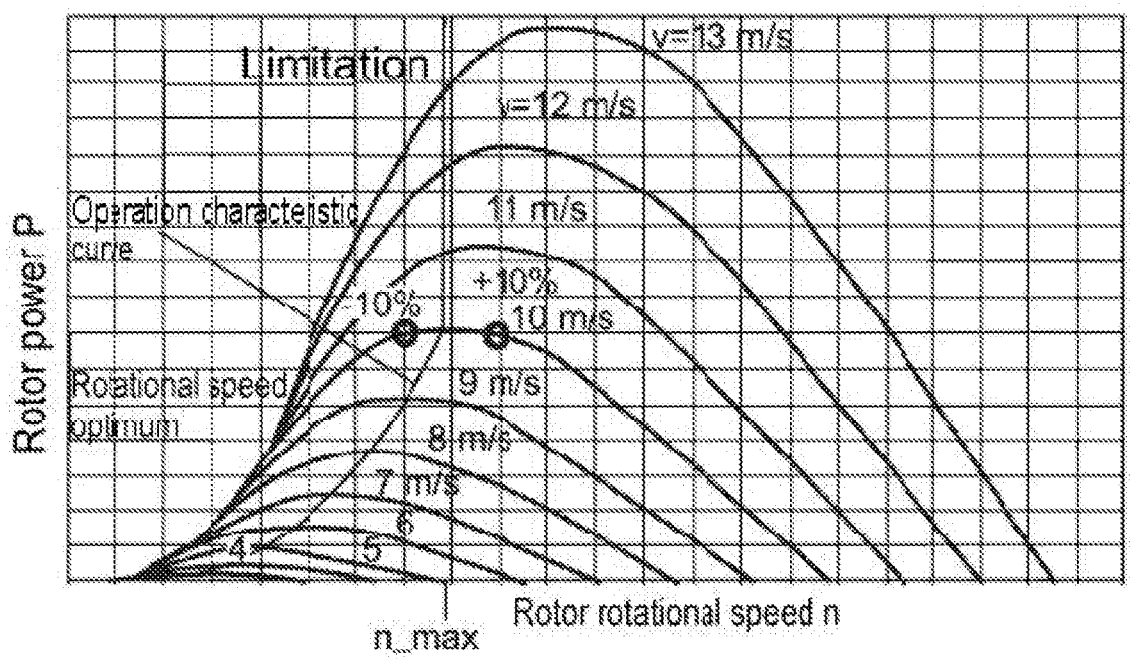
FIG. 5 illustrates relationships between rotational speed and power.

FIG. 5 shows a set of power/rotational speed curves, namely power/rotational speed curves for various wind speeds from 3 m/s to 13 m/s. The illustration is merely schematic, without numerical values. A normalization respectively to the nominal rotational speed and the rated power of the rotor could be assumed.

Firstly, it is evident that the power P, which is plotted as a function of the rotational speed n in each of the curves, rises with the rotational speed up to a maximum. The power optimum is there. For wind speeds of 3 to 10 m/s, this optimum is depicted by an operation characteristic curve intersecting the set of curves. It reaches the maximum rotational speed in the case of the curve for 10 m/s and thus indicates the rotational speed optimum up until then. For higher wind speeds, the rotational speed optimum lies above the maximum rotational speed, which is depicted as n_max. Therefore, starting from the power/rotational speed curve for 10 m/s, the operation characteristic curve extends up perpendicularly because the installation is then limited with respect to the rotational speed.

By way of example, two operating points which deviate with respect to the operation characteristic curve and which lie approximately 10% below and respectively above the optimum rotational speed are plotted in the power/rotational speed curve for 10 m/s. It is evident that this rotational speed deviation from the optimum rotational speed leads only to a significantly smaller reduction of the power. These two deviating operating points can specify a rotational speed band in which the wind power installation can operate in order to provide instantaneous reserve. This rotational speed band can preferably be chosen with different widths for different wind power installations, for different network connection points and/or for different situations, depending on boundary conditions.

The proposed solution thus affords possibilities for network support by the targeted provision of instantaneous reserves, which can be orientated to the structure of the electrical supply network. As a result, the dynamic behavior of the electrical supply network can also be influenced positively overall.

FIG. 6 illustrates a network section 650 comprising a large power plant 652, settlements 658, an industrial consumer 654, a town/city 656 and a plurality of wind farms WP1 to WP3. These elements in each case also represent by way of example further elements of their type and, for illustration, are each connected to a common line via a transformer T. The illustration is based partly on the illustration in FIG. 3, wherein the different voltage levels of the network are not distinguished, for simplification.

By means of the exemplary wind farms WP1 to WP3, electrical power can be fed into the electrical supply network 650. Said wind farms WP1 to WP3 operate independently, in principle. It is proposed here, however, that they can offer and provide instantaneous reserve and that that is coordinated by the network control device 651. To that end, the network control device 651 can predefine a reserve level for each of the wind farms WP1 to WP3 and transfer it to the respective wind farm WP1, WP2 and WP3. For transfer purposes a transfer device 659 is provided, which transfers data via a data transfer channel 653 to the wind farms WP1 to WP3, said data being input there in each case via an interface 660. For this purpose, each wind farm WP1 to WP3 can comprise a central farm control unit 661 (controller) in order to divide the reserve level predefined by the network control device 651 among the wind power installations of the wind farm.

Figure 7:
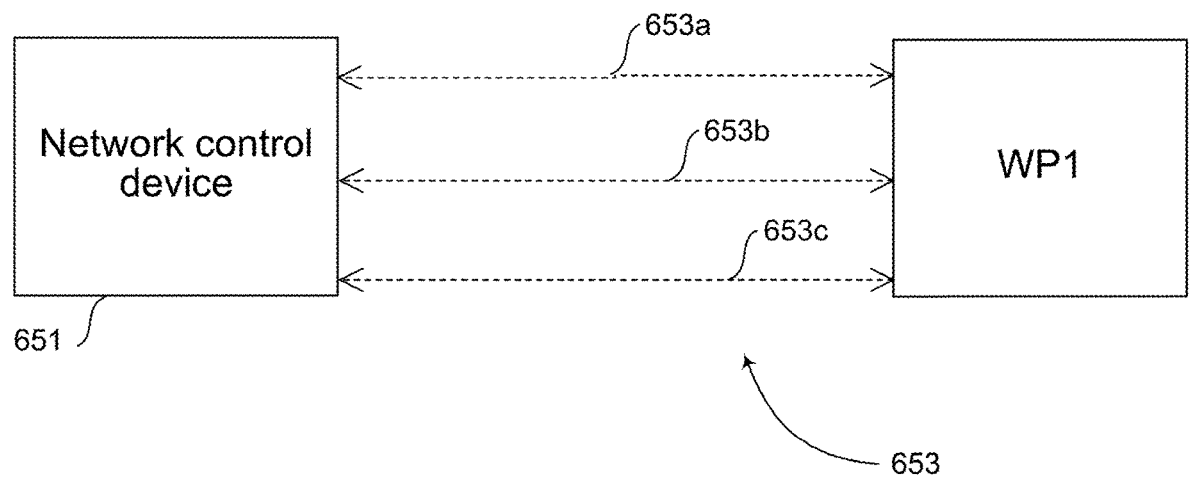
FIG. 7 shows communication between a wind farm and a network control device.

A communication between the wind farms WP1 to WP3 and the network control device 651 can also take place bidirectionally, as elucidated by the respective illustration of the data transfer channels with arrows in both directions. The transfer can be carried out in a wired or wireless manner 653*a*, 653*b* or in a combination of both 653*c*, see, e.g., data transfer channels 653 in FIG. 7, which shows communication between the wind farm WP1 and the network control device 651.

As a result, the network control device 651 can also take account of data of the respective wind farm. It is possible to achieve the effect of taking account of states of the respective wind farm WP1, WP2 and WP3. The bidirectional information transfer also opens up the possibility of the wind farm functioning as a measurement sensor and recording measurement values of the electrical supply network 650, in particular voltage and frequency, and transferring these measurement data for further use to the network control device.

Preferably, information concerning the actual feed-in of instantaneous reserve is transferred to the network control device 651. The network control device 651 preferably also knows the offered instantaneous reserves and can forward that in turn to a further control center and/or evaluate that for the determination of the respective reserve levels.

Figure 8:
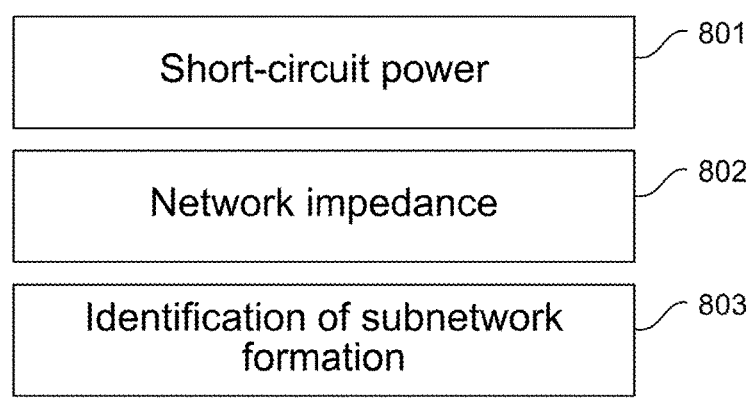
FIG. 8 shows a list of criteria for setting a reserve level.

FIG. 8 shows a list of criteria for setting a reserve level. The short-circuit power 801 directly is taken into consideration and the reserve level is set depending thereon. A further possibility is thus to take account of a determined network impedance 802 and to set the reserve level depending thereon. Additionally or alternatively, it is proposed to set the reserve level depending on whether a subnetwork formation in which a subnetwork has formed has been identified 803.

Figure 9:
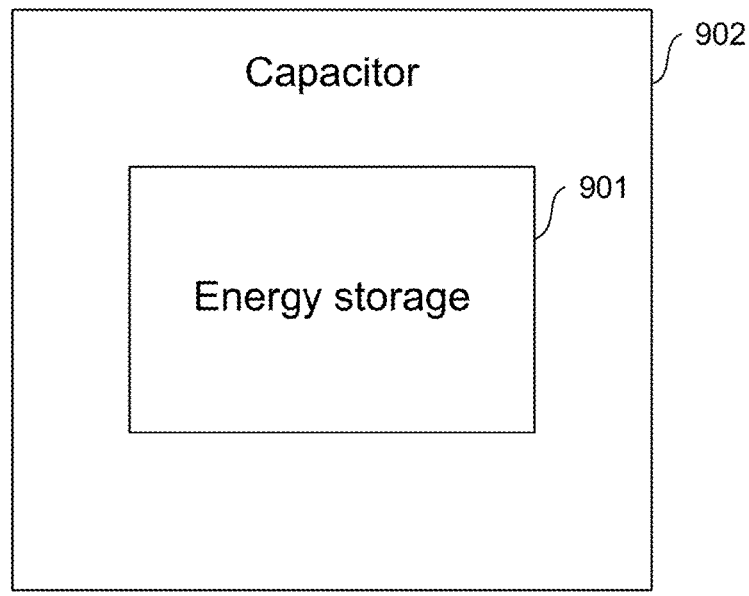
FIG. 9 illustrates storage energy of a capacitor.

FIG. 9 illustrates storage energy 901 of a capacitor 902.

Figure 10:
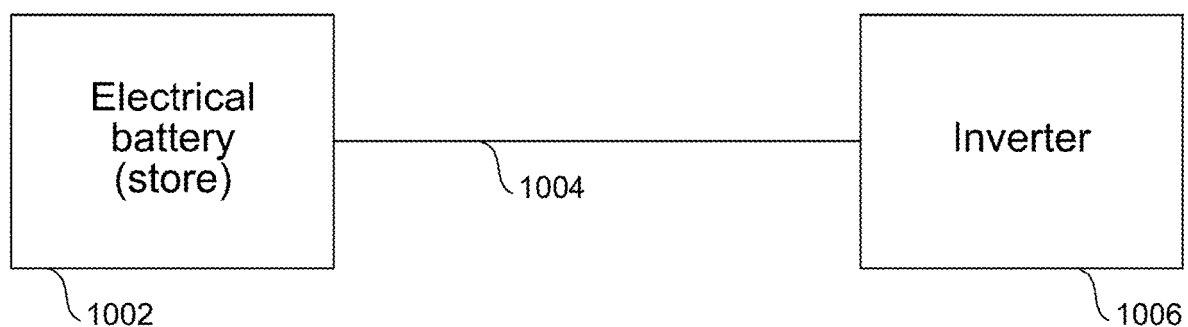
FIG. 10 shows a store provided in the form of an electrical battery connected to a DC voltage link circuit of an inverter.

FIG. 10 shows a store provided in the form of an electrical battery 1002 connected to a DC voltage link circuit 1004 of an inverter 1006.

The invention claimed is:

1. A method for feeding electrical power at a network connection point into an electrical supply network by at least one wind power installation, the method comprising:

generating electrical power from wind, feeding the generated electrical power or a portion of the generated electrical power into the electrical supply network, providing an instantaneous reserve for at least one of: additionally feeding or reducing the feeding of the generated electrical power or the portion of the generated electrical power into the electrical supply network, providing the instantaneous reserve being operative to support the electrical supply network, and additionally feeding electrical power or reducing the fed-in generated electrical power or the portion of the generated electrical power up to the provided instantaneous reserve and based on at least one of: a network property or an external requirement, wherein a reserve level of the instantaneous reserve is settable, wherein providing the instantaneous reserve at the reserve level includes at least one of:

providing a rotational speed range for operating the at least one wind power installation with a rotational speed in the rotational speed range, wherein the rotational speed range and the rotational speed are selected such that a decrease in the rotational speed to a lower value of the rotational speed range causes the at least one wind power installation to provide the instantaneous reserve at the reserve level, wherein the instantaneous reserve is provided from rotational energy of the at least one wind power installation, providing a lower rotational speed and an upper rotational speed that is higher than the lower rotational speed by a rotational speed difference, and operating the at least one wind power installation at the upper rotational speed, wherein the rotational speed difference is selected such that decreasing the upper rotational speed to be closer to the lower rotational speed frees the rotational energy of the at least one wind power installation to be used as the instantaneous reserve at the reserve level, altering an operating point of the at least one wind power installation, or providing an electrical energy store configured to store energy that is retrievable at the reserve level.

2. The method as claimed in claim 1, further comprising:
setting the reserve level based on a property of the network connection point.

3. The method as claimed in claim 1, comprising:
setting the reserve level based on at least one criterion from a list including:
a short-circuit power at the network connection point,
a network impedance at the network connection point,
a short-circuit current ratio at the network connection point, or
an identification of a subnetwork formation.

4. The method as claimed in claim 1, wherein additionally feeding the electrical power or reducing the generated electrical power or the portion of the generated electrical power includes:
determining an amount of the additionally-fed electrical power or a reduction of the fed-in generated electrical power or the portion of the generated electrical power based on a setting function that depends on both a state of the electrical supply network and the reserve level.

5. The method as claimed in claim 4, wherein the reserve level is a multiplier of the setting function or an amplification of the setting function.

6. The method as claimed in claim 1, comprising at least one of:
inputting a predefined value for altering the reserve level to the at least one wind power installation via an interface of the at least one wind power installation, or
outputting, by the at least one wind power installation, the reserve level of the at least one wind power installation to at least one of: other wind power installations or a central control unit monitoring a plurality of network connection points.

7. The method as claimed in claim 1, comprising:
detecting a network oscillation representing oscillation of a frequency of the electrical supply network, and
setting the reserve level based on the detected network oscillation.

8. The method as claimed in claim 1, comprising:
setting the reserve level based on a coupling strength of the network connection point to the electrical supply network, wherein the coupling strength is a measure a strength of a coupling of the network connection point to the electrical supply network.

9. The method as claimed in claim 1, wherein additionally feeding the electrical power or reducing the fed-in generated electrical power is performed based on at least one criterion of criteria from a list including:
a change in a network voltage of the electrical supply network,
a change in a network frequency of the electrical supply network,
a power difference between generated and consumed power in the electrical supply network, or
a requirement communicated externally.

10. The method as claimed in claim 1, wherein additionally feeding the electrical power or reducing the fed-in generated electrical power is performed while drawing or storing:
storage energy of at least one capacitor,
rotational energy of the at least one wind power installation, and
storage energy of at least one battery store,
wherein depending on an amount of energy drawn or stored in order of:
initially storage energy is drawn from or stored in the capacitor,
then rotational energy from the at least one wind power installation is used if further energy is required, and
then storage energy from the battery store is used if further energy is required.

11. A method for feeding electrical power at a plurality of network connection points into the electrical supply network by a respective plurality of wind power installation, wherein a method as claimed in claim 1 is used for feeding in at each of the network connection point of the plurality of network connection points and the reserve level is set differently for each of the network connection point of the plurality of network connection points.

12. The method as claimed in claim 11, wherein an overall instantaneous reserve is provided for the plurality of network connection points, and wherein the overall instantaneous reserve has an overall reserve level that is determined based on a plurality of respective reserve levels of the plurality of network connection points, wherein the overall reserve level corresponds to a sum of the plurality of respective reserve levels of the plurality of network connection points.

13. A wind power installation for feeding electrical power at a network connection point into an electrical supply network, comprising:
an aerodynamic rotor,
a generator configured to generate electrical power from wind,
a feed-in unit configured to feed the generated electrical power or a portion of the generated electrical power into the electrical supply network, and
a controller configured to:
provide an instantaneous reserve for feeding into the electrical supply network to support the electrical supply network,
control the wind power installation such that the provided instantaneous reserve or a portion of the instantaneous reserve is fed into the electrical supply network based on at least one of: a network property or an external requirement to support the electrical supply network, and
set a reserve level of the instantaneous reserve,
wherein providing the instantaneous reserve at the reserve level includes at least one of:
providing a rotational speed range for operating the wind power installation with a rotational speed in the rotational speed range, wherein the rotational speed range and the rotational speed are selected such that a decrease in the rotational speed to a lower value of the rotational speed range causes the wind power installation to provide the instantaneous reserve at the reserve level, wherein the instantaneous reserve is provided from rotational energy of the wind power installation,
providing a lower rotational speed and an upper rotational speed that is higher than the lower rotational speed by a rotational speed difference, and operating the wind power installation at the upper rotational speed, wherein the rotational speed difference is selected such that decreasing the upper rotational speed to be closer to the lower rotational speed frees the rotational energy of the wind power installation to be used as the instantaneous reserve at the reserve level, altering an operating point of the wind power installation, or providing an electrical energy store configured to store energy that is retrievable at the reserve level.

14. The wind power installation as claimed in claim 13, comprising:
at least one electrical energy store for providing the instantaneous reserve or the portion of the instantaneous reserve.

15. The wind power installation as claimed in claim 14, wherein the at least one electrical energy store is at least one battery, a capacitor or a capacitor bank.

16. A wind farm comprising a plurality of wind power installations including the wind power installation as claimed in claim 13.

17. A network control device for controlling a plurality of feed-in devices for feeding electrical power into an electrical supply network, wherein
each feed-in device of the plurality of feed-in devices includes:
at least one wind power installation configured to generate electrical power from wind,
a feed-in unit configured to feed the generated electrical power or a portion of the generated electrical power via a network connection point into the electrical supply network, and
a controller configured to:
providing an instantaneous reserve for feeding into the electrical supply network to support the electrical supply network, and
set a reserve level of the instantaneous reserve, and
the network control device is configured to set a plurality of different reserve levels for the respective plurality of feed-in devices, comprises:

a data transfer device configured to exchange data between the network control device and the plurality of feed-in devices, wherein providing the instantaneous reserve at the reserve level includes at least one of:

providing a rotational speed range for operating the at least one wind power installation with a rotational speed in the rotational speed range, wherein the rotational speed range and the rotational speed are selected such that a decrease in the rotational speed to a lower value of the rotational speed range causes the at least one wind power installation to provide the instantaneous reserve at the reserve level, wherein the instantaneous reserve is provided from rotational energy of the at least one wind power installation, providing a lower rotational speed and an upper rotational speed that is higher than the lower rotational speed by a rotational speed difference, and operating the at least one wind power installation at the upper rotational speed, wherein the rotational speed difference is selected such that decreasing the upper rotational speed to be closer to the lower rotational speed frees the rotational energy of the at least one wind power installation to be used as the instantaneous reserve at the reserve level, altering an operating point of the at least one wind power installation, or providing an electrical energy store configured to store energy that is retrievable at the reserve level.

18. The network control device as claimed in claim 17, wherein each feed-in device of the plurality of feed-in devices is a wind farm.

19. The network control device as claimed in claim 17, wherein the network control device is configured to:
record network states of the electrical supply network, and
determine the plurality of different reserve levels based on at least one of the recorded network states.

* * * * *